US011140950B2

(12) United States Patent
Takani et al.

(10) Patent No.: US 11,140,950 B2
(45) Date of Patent: Oct. 12, 2021

(54) FASTENER TAPE, SLIDE FASTENER AND FASTENER TAPE MANUFACTURING DEVICE

(71) Applicant: YKK CORPORATION, Tokyo (JP)

(72) Inventors: Go Takani, Guangdong (CN); Fulin Miao, Guangdong (CN); Ye Yuan, Guangdong (CN)

(73) Assignee: YKK CORPORATION, Tokyo (JP)

( * ) Notice: Subject to any disclaimer, the term of this patent is extended or adjusted under 35 U.S.C. 154(b) by 0 days.

(21) Appl. No.: 16/028,391

(22) Filed: Jul. 5, 2018

(65) Prior Publication Data
US 2019/0014867 A1 Jan. 17, 2019

(30) Foreign Application Priority Data

Jul. 12, 2017 (CN) .......................... 201720844035.2

(51) Int. Cl.
*A44B 19/24* (2006.01)
*A44B 19/34* (2006.01)
*B29D 5/02* (2006.01)
*A44B 19/42* (2006.01)

(52) U.S. Cl.
CPC .............. *A44B 19/34* (2013.01); *A44B 19/24* (2013.01); *A44B 19/42* (2013.01); *B29D 5/02* (2013.01)

(58) Field of Classification Search
CPC ............ B29D 5/02; A44B 19/42; A44B 19/34
See application file for complete search history.

(56) References Cited

U.S. PATENT DOCUMENTS 4,881,546 A * 11/1989 Kaessmann .......... A61B 17/085
606/217
5,008,986 A * 4/1991 Laudet ................. A43B 1/0072
24/389

(Continued)

FOREIGN PATENT DOCUMENTS

DE 8527827 11/1985
JP S49-65408 6/1974

(Continued)

OTHER PUBLICATIONS

"Office Action of Japan Counterpart Application", dated Jun. 4, 2019, with English translation thereof, p. 1-8.

(Continued)

*Primary Examiner* — Jason W San
(74) *Attorney, Agent, or Firm* — JCIPRNET

(57) ABSTRACT

The disclosure discloses a fastener tape, a slide fastener and a fastener tape manufacturing device. The fastener tape includes a fastener tape body and a fastener element fixed to a first side of the fastener tape body. A second side of the fastener tape body is folded toward a back side of the fastener tape body, and a bent part extending along a length direction of the fastener tape is formed after the folding. The bent part divides the fastener tape body into a first fastener tape part and a second fastener tape part respectively located on a front surface and a back surface of the fastener tape body. Moreover, a fixing holding part is further disposed between the first fastener tape part and the second fastener tape part for maintaining the folded state of the fastener tape body.

4 Claims, 9 Drawing Sheets

(56) References Cited

U.S. PATENT DOCUMENTS

| | | | | |
|---|---|---|---|---|
| 5,024,537 A * | 6/1991 | Tilman | A44B 19/34 | 206/820 |
| 9,420,854 B1 * | 8/2016 | Sloan | A44B 19/34 | |
| 10,863,801 B2 * | 12/2020 | Hosokawa | A44B 19/42 | |
| 10,959,497 B2 * | 3/2021 | Zhang | A44B 19/34 | |
| 2002/0076551 A1 * | 6/2002 | Watanabe | A44B 19/34 | 428/354 |
| 2002/0081427 A1 * | 6/2002 | Yamakita | A44B 19/34 | 428/355 AC |
| 2002/0100148 A1 * | 8/2002 | Tominaga | A44B 19/12 | 24/391 |
| 2004/0250384 A1 * | 12/2004 | Arai | A44B 19/34 | 24/432 |
| 2005/0034284 A1 * | 2/2005 | Yu | A44B 19/34 | 24/397 |
| 2006/0010660 A1 * | 1/2006 | Stenhall | A44B 19/34 | 24/389 |
| 2010/0269311 A1 * | 10/2010 | Jacobsen | A45C 13/103 | 24/382 |
| 2011/0005042 A1 * | 1/2011 | Thomas | A44B 19/34 | 24/381 |
| 2012/0297583 A1 * | 11/2012 | Sugimoto | A44B 19/42 | 24/415 |
| 2015/0082517 A1 * | 3/2015 | Mclachlan | A44B 18/0003 | 2/336 |
| 2016/0095405 A1 * | 4/2016 | Wang | A45C 13/103 | 24/381 |
| 2016/0255920 A1 * | 9/2016 | La Rocca | A44B 19/34 | |
| 2017/0332744 A1 * | 11/2017 | Kameyama | A44B 19/08 | |
| 2018/0360172 A1 * | 12/2018 | Chou | B29C 45/14065 | |
| 2020/0359753 A1 * | 11/2020 | Komiyama | A44B 19/26 | |

FOREIGN PATENT DOCUMENTS

| | | |
|---|---|---|
| JP | S5443931 | 12/1979 |
| JP | S5836811 | 3/1983 |
| JP | S6239713 | 10/1987 |
| JP | 2008056345 | 3/2008 |
| JP | 2009056076 | 3/2009 |
| JP | 2016538890 | 12/2016 |
| KR | 20040033671 | 4/2004 |

OTHER PUBLICATIONS

"Office Action of Japan Counterpart Application", dated Mar. 24, 2020, with English translation thereof, pp. 1-6.

* cited by examiner

FASTENER TAPE, SLIDE FASTENER AND FASTENER TAPE MANUFACTURING DEVICE

CROSS-REFERENCE TO RELATED APPLICATION

This application claims the priority benefit of China Utility Model Application No. 201720844035.2, filed on Jul. 12, 2017. The entirety of the above-mentioned utility model application is hereby incorporated by reference herein and made a part of this specification.

BACKGROUND

Technical Field

The disclosure relates to the field of slide fastener technology, and specifically relates to a fastener tape, a slide fastener and a fastener tape manufacturing device.

Related Art

As a daily product, slide fasteners are widely used in various fields, especially in the clothing field. Since slide fasteners frequently contact the human body, they are often required to have not only basic functions such as opening and closing but also other functions such as, for example, preventing a hard portion such as a fastener element or a slider from directly contacting the skin.

Generally, a slide fastener includes a fastener tape, a fastener element fixed to the fastener tape, and a slider for engaging and disengaging the fastener elements respectively on two fastener tapes. A main material of the fastener element includes resin, nylon or metal; a main material of the slider includes metal or resin. Thus, both the slider and the fastener element are hard portions and may cause an uncomfortable feeling to the human body when directly contacting the skin. Metal sliders and metal fastener elements particularly may further cause an ice-cold feeling when they directly contact the skin.

Accordingly, Japanese Utility Model Laid-Open No. S49-65408U provides a slide fastener in which a fabric tape is additionally sewn on an outer side edge of a fastener tape (usually a fabric tape) so as to shield a slider and a fastener element. However, since this fabric tape is sewn and fixed on the fastener tape, the operation thereof is relatively troublesome, and a sewing thread may remain on the fastener tape, resulting in an appearance defect. Particularly, the sewn fabric tape has inferior fixation ability, and two mutually close side edges of two fabric tapes may warp toward a back side of the slide fastener such that a larger portion of the slider or the fastener element is exposed, and a good shielding effect cannot be achieved.

SUMMARY

One of the embodiments of the present invention provides a fastener tape and a slide fastener, wherein the fastener tape and the slide fastener are capable of well maintaining a folded state of a fastener tape body, such that the fastener tape body is firmly fixed and unlikely to warp, and thus can more reliably shield a slider and/or a fastener element.

One of the embodiments of the present invention provides a fastener tape for forming a slide fastener is provided. The fastener tape includes a fastener tape body and a fastener element fixed to a first side of the fastener tape body. A second side of the fastener tape body is folded toward a back side of the fastener tape body, and a bent part extending along a length direction of the fastener tape is formed after the folding. The bent part divides the fastener tape body into a first fastener tape part and a second fastener tape part respectively located on a front surface and a back surface of the fastener tape body. Moreover, a fixing holding part is further disposed between the first fastener tape part and the second fastener tape part for maintaining the folded state of the fastener tape body.

According to one of the embodiments of the present invention, a slide fastener is provided, including a first fastener tape, a second fastener tape, and a slider for joining or separating the first fastener tape and the second fastener tape, wherein at least one of the first fastener tape and the second fastener tape is the aforesaid fastener tape.

Another aspect of the disclosure provides a fastener tape manufacturing device for manufacturing the aforesaid fastener tape or slide fastener.

According to one of the embodiments of the present invention, a fastener tape manufacturing device for manufacturing the aforesaid fastener tape is provided, including: a first restricting part, having a first containing chamber for allowing insertion of the fastener tape therethrough so as to restrict the fastener tape, wherein the fastener tape body is inserted through the first containing chamber while in a folded state; a fixing forming part located downstream of the first restricting part and for forming the fixing holding part; and a fastener tape driving part for driving the fastener tape to be fed from upstream to downstream along the length direction of the fastener tape.

BRIEF DESCRIPTION OF THE DRAWINGS

Hereinafter, embodiments of a fastener tape, a slide fastener and a fastener tape manufacturing device according to the disclosure will be described with reference to the accompanying drawings. In the drawings.

DESCRIPTION OF THE EMBODIMENTS

Figure 1A:
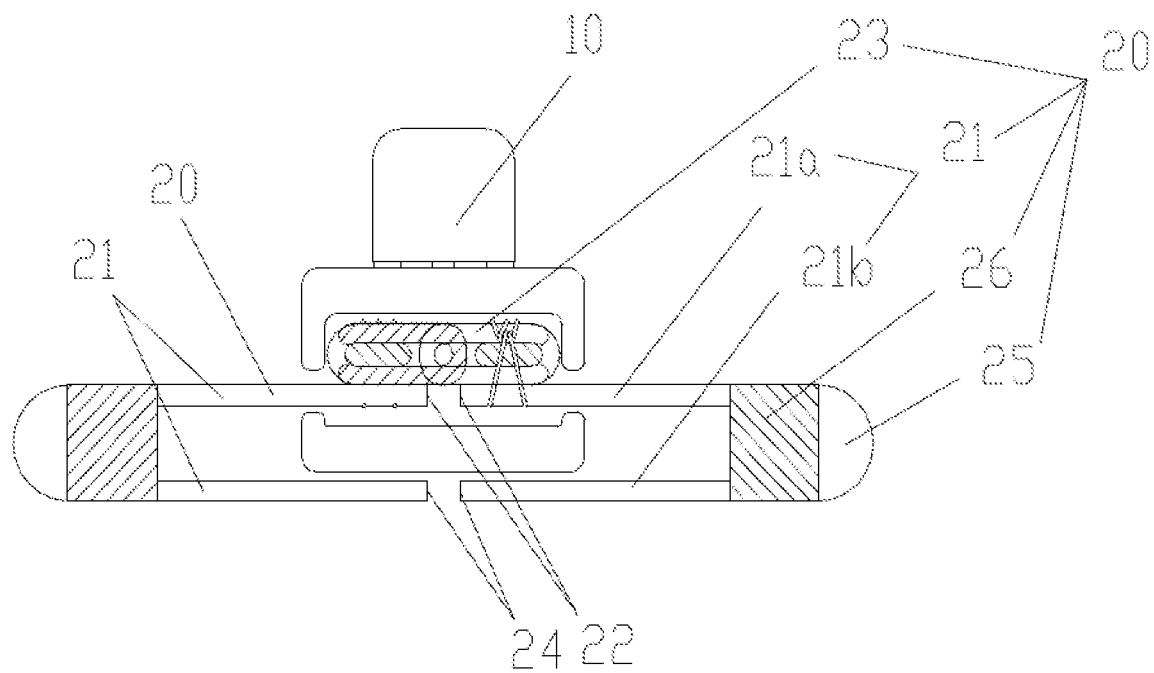
FIG. 1A is a schematic cross-sectional view of a slide fastener according to a first embodiment of the disclosure.

In the fastener tape of the disclosure, there is no need to perform superfluous operations such as sewing or the like on the fastener tape body. By folding the fastener tape body as a single integral unit and disposing the fixing holding part on the folded fastener tape body, the folded state of the fastener tape body can be well maintained, and meanwhile, the second fastener tape part is firmly fixed and unlikely to warp. After the slide fastener is formed, a slider and/or the fastener element can be more reliably shielded.

According to some embodiments, the fixing holding part is adjacent to the bent part.

According to some embodiments, the fixing holding part is a thermally welded structure or an adhesive bonded structure; and/or, a width dimension of the fixing holding part is 10% to 50% of a width dimension of the first fastener tape part of the fastener tape body.

According to some embodiments, a second fastener tape part of at least one of the first fastener tape and the second fastener tape at least covers part of the slider or part of a fastener element.

According to some embodiments, the first fastener tape and the second fastener tape both include a first fastener tape part and the second fastener tape part. In a closed state of the slide fastener, the second side of the first fastener tape and the second side of the second fastener tape overlap each other, abut against each other, or are separated from each other by a specified distance.

According to some embodiments, when a distance between the second side of the first fastener tape and the second side of the second fastener tape is set to L, L is equal to or less than a maximum distance between two outer side surfaces of a slider post part; or, L is equal to or less than a center distance between a core part of the first fastener tape and a core part of the second fastener tape, wherein the core parts of the first fastener tape and the second fastener tape are located on the first side and are for fixing the fastener element; or, L is equal to or less than an overlap distance between the fastener element on the first fastener tape and the fastener element on the second fastener tape after the fastener elements are engaged with each other.

The fastener tape manufacturing device of the disclosure is capable of folding the fastener tape body as a single integral unit in a convenient manner and of forming the fixing forming part on the folded fastener tape body, thus well maintaining the folded state of the fastener tape without the need to perform superfluous sewing on the fastener tape body.

According to some embodiments, the fastener tape manufacturing device further includes: a bending forming part located upstream of the first restricting part, and having a second containing chamber for allowing insertion of the fastener tape therethrough, wherein the fastener tape body is inserted through the second containing chamber while in a non-folded state, and the second side of the fastener tape body is bent toward the back side of the fastener tape body after the fastener tape body is inserted through the second containing chamber.

According to some embodiments, a portion of the second containing chamber for allowing insertion of the fastener tape body therethrough is a circular arc-shaped slit, a horizontal U-shaped slit, or a horizontal V-shaped slit.

According to some embodiments, the fixing forming part includes an ultrasonic vibrating device; and/or, the fastener tape driving part includes a roller.

According to some embodiments, a rolling surface of the roller is opposing the fixing forming part, and the fastener tape body in the folded state is sandwiched between the roller and the fixing forming part.

According to some embodiments, the first restricting part includes an upper die and a lower die, and the first containing chamber is formed between the upper die and the lower die.

According to some embodiments, the first containing chamber has a left-right symmetrical structure for simultaneously containing two fastener tapes in a joined state.

According to some embodiments, a concave groove is provided in a vicinity of a center of a bottom surface of the first containing chamber and is for accommodating the second side of the fastener tape body.

According to some embodiments, a partition wall is disposed in a middle of the concave groove along a longitudinal direction of the concave groove.

Figure 1B:
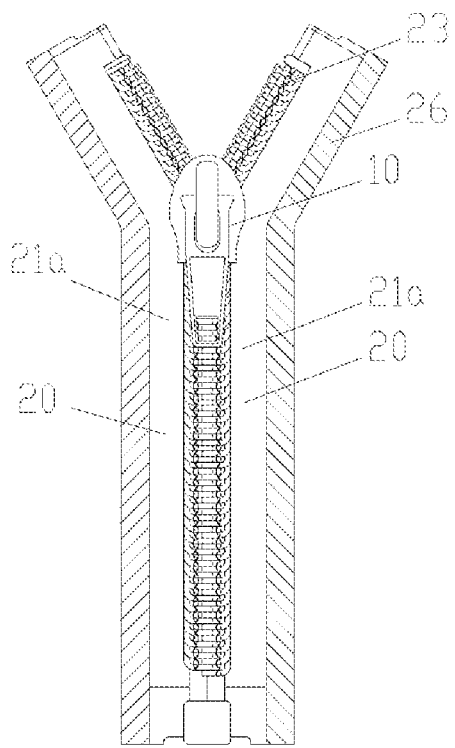
FIG. 1B is a schematic view of a front surface structure of the slide fastener shown in FIG. 1A.
Figure 1C:
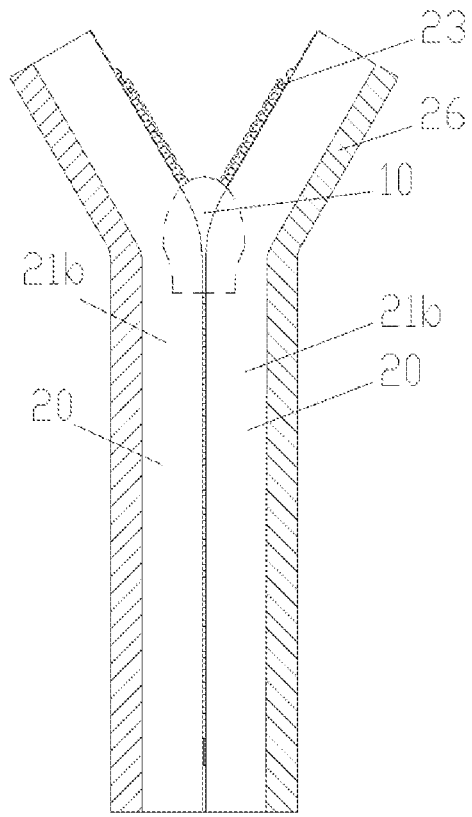
FIG. 1C is a schematic view of a back surface structure of the slide fastener shown in FIG. 1A.

Referring first to FIG. 1A, FIG. 1B and FIG. 1C, a slide fastener according to an embodiment of the disclosure is described. The slide fastener includes a slider 10 and two fastener tapes 20, wherein each of the fastener tapes 20 includes a fastener tape body 21, and a fastener element 23 fixed to a first side 22 of the fastener tape body 21. In the disclosure, the fastener tape body 21 is, for example, a fabric tape.

Specifically, as shown in FIG. 1A, in the fastener tape 20 of the disclosure, a second side 24 of the fastener tape body 21 is folded toward a back side of the fastener tape body 21, and a bent part 25 extending along a length direction is formed after the folding. The bent part 25 divides the fastener tape body 21 into two portions, namely, a first fastener tape part 21a and a second fastener tape part 21b respectively located on a front surface and a back surface of the fastener tape body 21. That is, the fastener element 23 and the first side 22 are located on the first fastener tape part 21a, and the second side 24 is located on the second fastener tape part 21b. Moreover, in the folded state, the bent part 25 substantially constitutes an outer side edge of the fastener tape 20, i.e., an outer side edge of the corresponding slide fastener.

After the fastener tape body 21 is folded, in order to stably maintain the folded state, a fixing holding part 26 is further disposed between the first fastener tape part 21a and the second fastener tape part 21b.

In the fastener tape 20 of the disclosure, the second fastener tape part 21b in the folded state may be used to shield or cover the fastener element 23. After the slide fastener is formed using the fastener tape 20, the second fastener tape part 21b in the folded state may shield or cover the slider 10. For example, the second fastener tape part 21b may at least shield or cover part of the fastener element 23 and/or the slider 10, thus preventing these hard or ice-cold portions from directly contacting the human body, so as to make the skin of the human body feel more comfortable.

Since the second fastener tape part 21b and the first fastener tape part 21a are formed as a single integral unit before the folding, unlike the related art in which an additional fabric tape is sewn on the fastener tape, a joining strength between the second fastener tape part 21b and the first fastener tape part 21a of the fastener tape 20 of the disclosure is sufficiently high, and there is no sewing thread which affects the overall appearance of the slide fastener. Thus, the fastener tape 20 of the disclosure and the corresponding slide fastener ensure beautiful appearance and robustness of the fastener tape body 21 while improving comfortableness.

In addition, by disposing the fixing holding part 26 between the first fastener tape part 21a and the second fastener tape part 21b, the fastener tape body 21 of each fastener tape 20 can be maintained in a folded shape in a convenient manner. In one respect, it can be ensured that the second fastener tape part 21b always at least shields or covers part of the fastener element 23 and/or the slider 10, so the need to make adjustments during opening or closing of the slide fastener, for example, is eliminated, which is convenient to users. In another respect, convenience can also be offered to clothing designers so that they, for example, will not be bothered with the state of the second fastener tape part 21b when they are sewing the corresponding slide fastener on clothes.

Figure 2:
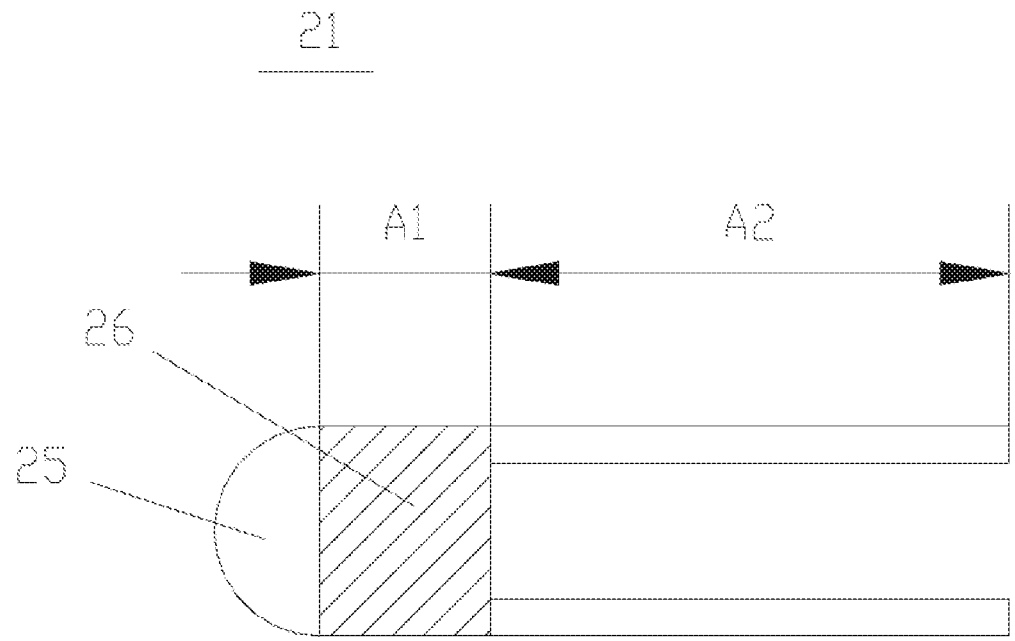
FIG. 2 is a schematic cross-sectional view of a fastener tape body of a fastener tape according to a second embodiment of the disclosure.

In addition, as shown in FIG. 2, the fixing holding part 26 is adjacent to the bent part 25. When the second fastener tape part 21b has a fixed width, as the fixing holding part 26 approaches the bent part 25, the width of a freely suspended portion of the second fastener tape part 21b correspondingly increases. Thus, when the second fastener tape part 21b covers the fastener element 23 and/or the slider 10, flatness and smoothness of the second fastener tape part 21b can be more easily maintained.

In the fastener tape 20 of the disclosure, the fixing holding part 26 may be a thermally welded structure (i.e., structure obtained by thermally melting a material or part of the material and then connecting the same) or an adhesive bonded structure. According to some embodiments, the thermally welded structure is an ultrasonic pressure welded structure. That is, in order to stably maintain the folding relationship between the second fastener tape part 21b and the first fastener tape part 21a, an ultrasonic pressure welding technique may be employed to perform a pressure welding process on the fastener tape body 21, thus achieving surface contact between the second fastener tape part 21b and the first fastener tape part 21a, which is notably improved in retentivity as compared with thread contact achieved by a sewing thread, or point contact. The ultrasonic pressure welding process is performed, for example, in the following manner. A tool head of an ultrasonic vibrating device abuts against a corresponding portion of the fastener tape body 21. Heat generated on the corresponding portion of the fastener tape body 21 by high frequency ultrasonic vibrations is used to locally melt the fastener tape body 21, thus connecting an upper and lower layers of material together.

In addition, the thermally welded structure may also be formed using other types of thermal welding techniques. For example, a heating element (for example, an electric heating element) is employed to abut against the corresponding portion of the fastener tape body 21, and the heat generated by the heating element can also locally melt the fastener tape body 21, thus connecting the upper and lower layers of material together.

Generally, a fastener tape body of a fastener tape is obtained by weaving using a polyester yarn or a blended yarn of polyester fibers and natural fibers as warp and weft. Since the polyester fibers may be in a molten state at high temperature, in order to reliably form the fixing holding part 26, thermal welding is more suitable.

Alternatively, an adhesive may further be provided between the second fastener tape part 21b and the first fastener tape part 21a, so as to firmly stick corresponding portions of the second fastener tape part 21b and the first fastener tape part 21a together.

As shown in FIG. 2, a width dimension of the fixing holding part 26 is 10% to 50% of a width dimension of the first fastener tape part 21a of the fastener tape body 21; according to some embodiments, the width dimension of the fixing holding part 26 is one-third of the width dimension of the first fastener tape part 21a. In FIG. 2, the width dimension of the fixing holding part 26 is denoted by A1, and the width dimension of the first fastener tape part 21a is denoted by A2. Thus, A1=(10% to 50%)A2; according to some embodiments, A1=(⅓)A2.

By properly setting the width of the fixing holding part 26, flatness and smoothness of the second fastener tape part 21b can be more reliably maintained, and it can be ensured that the second fastener tape part 21b is unlikely to warp toward the back side of the fastener tape 20. Thus, it can be ensured that the second fastener tape part 21b is folded to or covers the fastener element 23 and/or the slider 10.

A second aspect of the disclosure further provides a slide fastener. As shown in FIG. 1A, the slide fastener includes the two fastener tapes 20 (which may be referred to as, for example, a first fastener tape and a second fastener tape), and the slider 10 for joining or separating the two fastener tapes 20, wherein at least one of the two fastener tapes 20 is the fastener tape proposed in the disclosure, i.e., the fastener tape body 21 thereof includes the first fastener tape part 21a, the second fastener tape part 21b, the bent part 25 and the fixing holding part 26.

When one (or two) fastener tapes 20 of the slide fastener of the disclosure includes the second fastener tape part 21b, the second fastener tape part 21b may be used to shield or cover the slider 10 or the fastener element 23, thus reducing the likelihood of the slider 10 and the fastener element 23 contacting the skin of the human body, so as to make the human body feel more comfortable.

In the embodiment shown in FIG. 1A to FIG. 1C, the two fastener tapes 20 both employ the fastener tape of the disclosure, i.e., both include the second fastener tape part 21b. However, when only one of the fastener tapes 20 employs the fastener tape of the disclosure, the same effects can still be achieved. In such cases, as shown in FIG. 9, the other fastener tape may be a conventional fastener tape (which may, for example, includes no second fastener tape part).

In addition, in the slide fastener of the disclosure, the second fastener tape part 21b at least covers part of the slider 10 or part of the fastener element 23. For example, the second fastener tape part 21b may cover the entire slider 10 or may only cover part of the slider 10; similarly, the second fastener tape part 21b may cover the entire fastener element 23 or may only cover part of the fastener element 23. It is easy to understand that, when the second fastener tape part 21b covers the entire slider 10, i.e., when the slide fastener is in the closed state, the second fastener tape part 21b also fully covers the entire fastener element 23.

Figure 9:
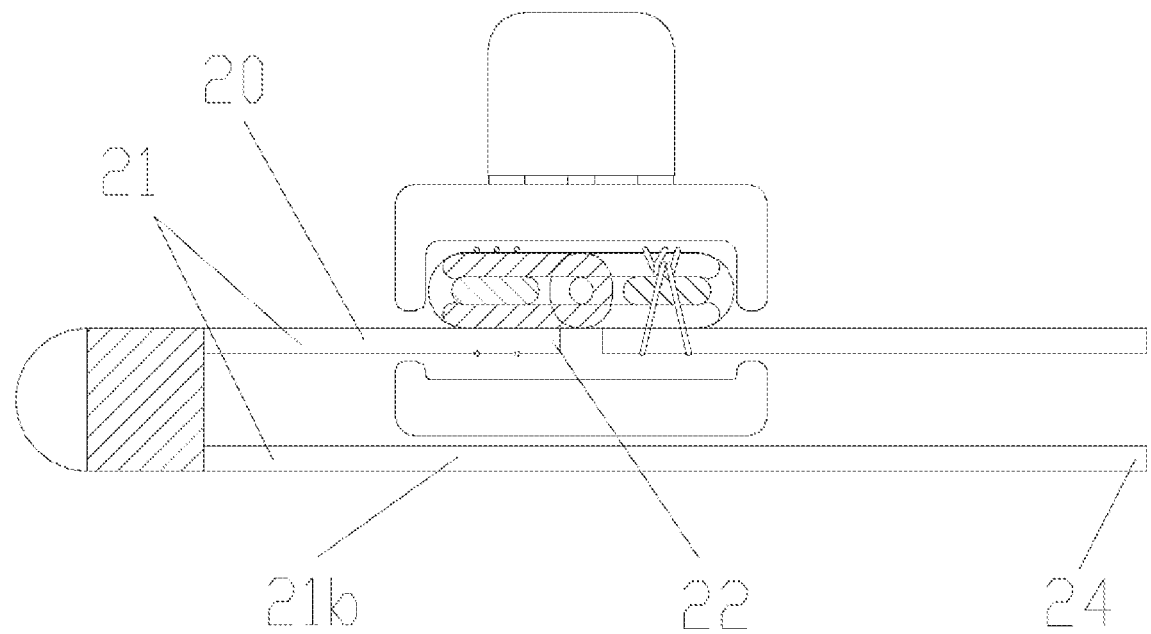
FIG. 9 is a schematic cross-sectional view of a slide fastener according to an eighth embodiment of the disclosure.

Furthermore, the effect "at least covers part of the slider 10 or part of the fastener element 23" can be achieved solely by the second fastener tape part 21b of one fastener tape, as shown in FIG. 9 in which the other fastener tape is a conventional fastener tape. The above effect can also be jointly achieved by the respective second fastener tape parts 21b of two fastener tapes, as shown in FIG. 1A to FIG. 1C, FIG. 3 and FIG. 4.

In addition, when the two fastener tapes 20 both employ the fastener tape of the disclosure, i.e., when the first fastener tape and the second fastener tape both include the first fastener tape part 21a and the second fastener tape part 21b, in the closed state of the slide fastener, the second side 24 of the first fastener tape and the second side 24 of the second fastener tape may overlap each other, abut against each other, or may be separated from each other by a specified distance.

Figure 3:
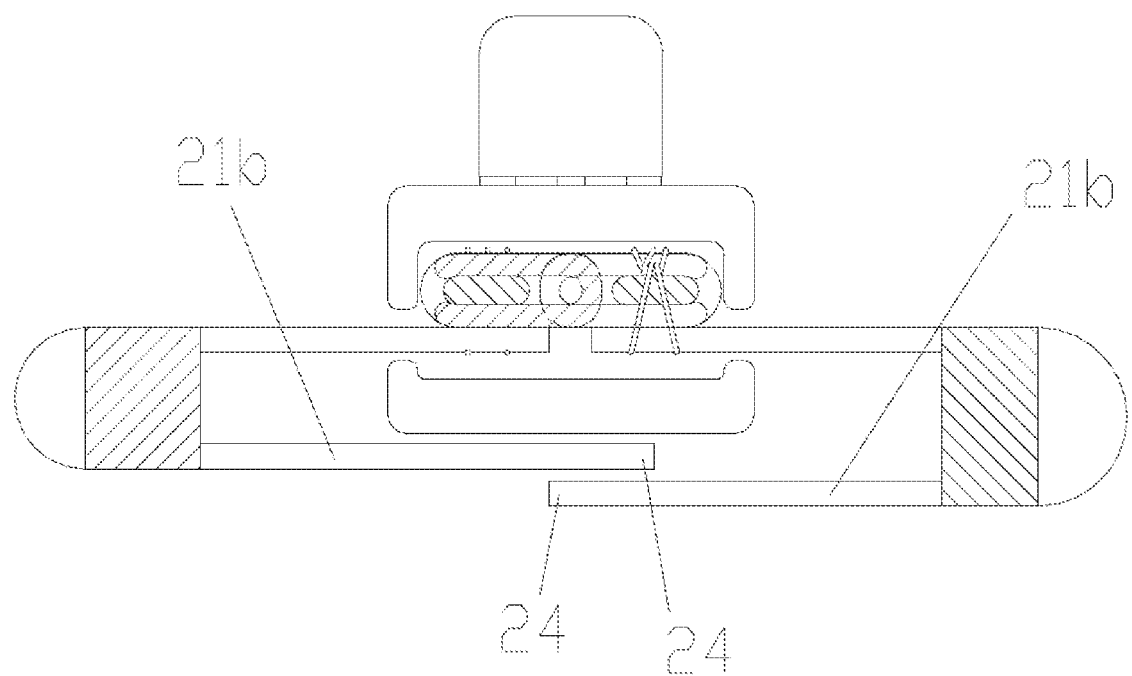
FIG. 3 is a schematic cross-sectional view of a slide fastener according to a third embodiment of the disclosure.

For example, in the embodiment shown in FIG. 3, the second sides 24 of the two fastener tapes 20 overlap each other, i.e., inner portions of the corresponding second fastener tape parts 21b overlap, thus ensuring that both the slider 10 and the fastener element 23 are fully covered.

For another example, in an embodiment not illustrated, the second sides 24 of two fastener tapes 20 may abut against each other, i.e., the inner portions of the corresponding second fastener tape parts 21b may just contact but do not overlap each other, which also ensures that both the slider 10 and the fastener element 23 are fully covered.

Figure 4:
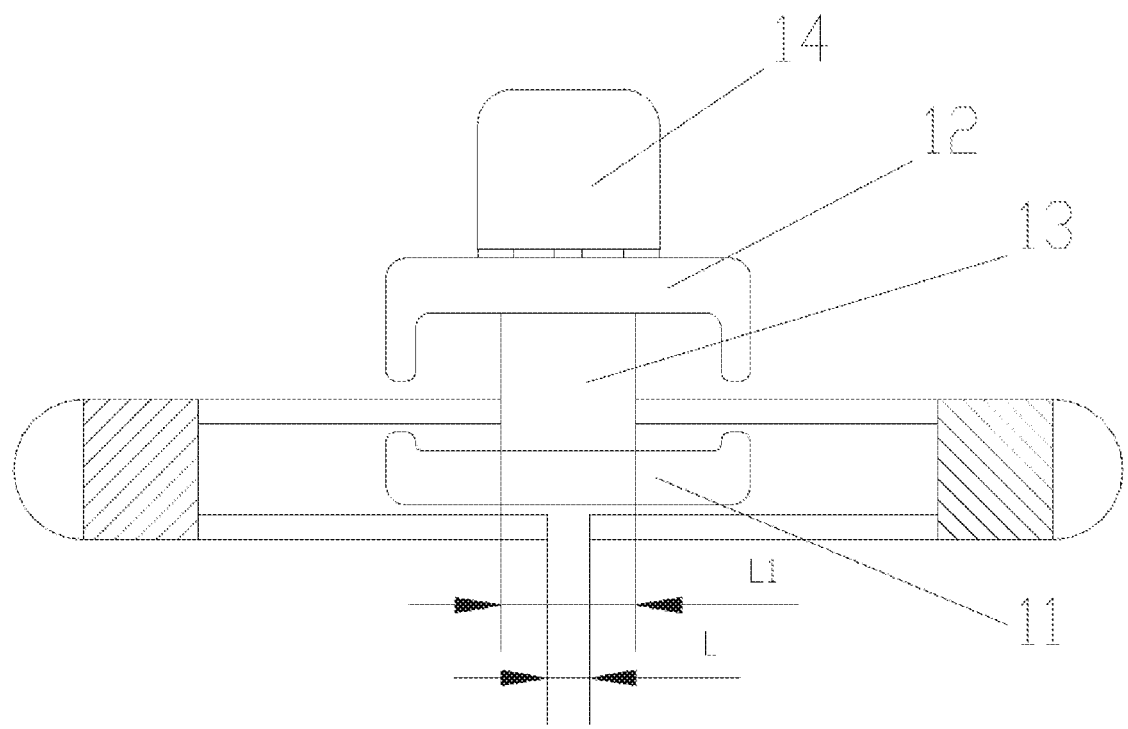
FIG. 4 is a schematic cross-sectional view of a slide fastener according to a fourth embodiment of the disclosure.

For still another example, in the embodiment in FIG. 4, the second sides 24 of the two fastener tapes 20 are separated from each other by the specified distance, such that a middle portion of a lower blade 11 of the slider 10 is not covered. However, since the second fastener tape part 21b has a certain thickness, and both side portions of the lower blade 11 have been covered, the uncovered middle portion is still unlikely to contact the skin and is prevented from lowering the comfortableness.

As shown in FIG. 4, the slider 10 includes the lower blade 11, an upper blade 12 and a post part 13 connecting the upper blade 12 with the lower blade 11. In addition, a pull tab 14 is further disposed on the upper blade 12 for operating the slider 10.

In the state in which the second side of the first fastener tape and the second side of the second fastener tape are separated from each other by a distance, the distance is denoted by L, and the distance L may have different value ranges.

In the embodiment shown in FIG. 4, L is equal to or less than a maximum distance L1 between two outer side surfaces of the slider post part 13. That is, in the closed state of the slide fastener, the distance L between the second sides of the two fastener tapes is at least shorter than the maximum distance L1 between the two outer side surfaces of the slider post part 13.

Figure 5:
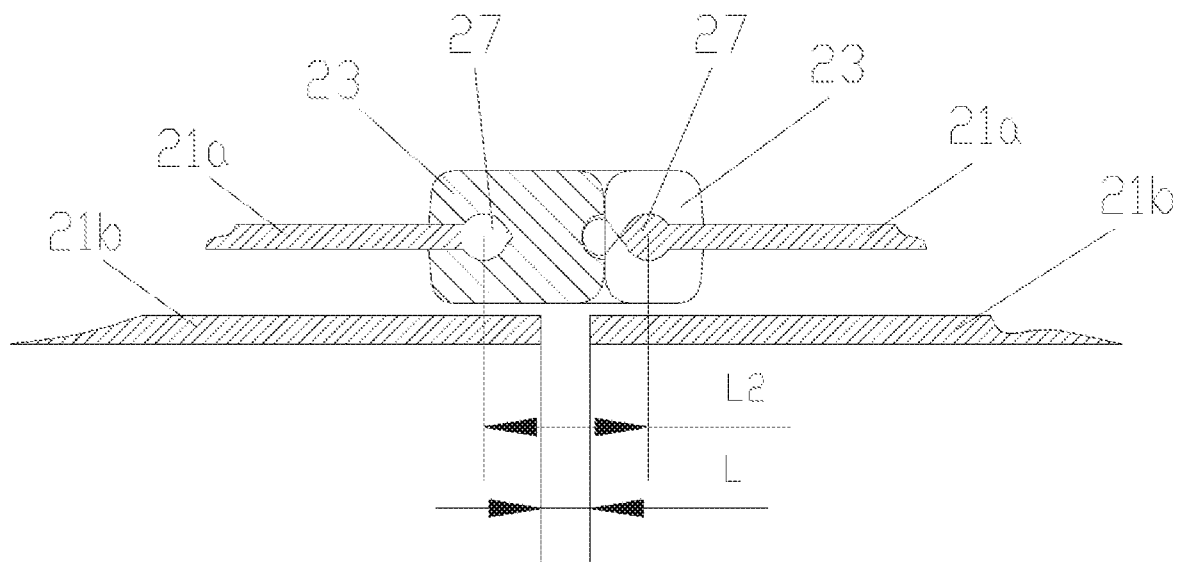
FIG. 5 is a schematic partial cross-sectional view of a slide fastener according to a fifth embodiment of the disclosure.

In the embodiment shown in FIG. 5, L is equal to or less than a center distance L2 between a core part 27 of the first fastener tape and the core part 27 of the second fastener tape, wherein the core parts 27 of the first fastener tape and the second fastener tape are located on the first side 22 and are for fixing the fastener element 23. That is, in the closed state of the slide fastener, the distance L between the second sides of the two fastener tapes is at least shorter than the center distance L2 between the core parts 27 of the two fastener tapes after the fastener elements 23 are engaged with each other. The slide fastener involved in this embodiment is, for example, a metal slide fastener (i.e., the fastener element thereof is made of metal).

Figure 6:
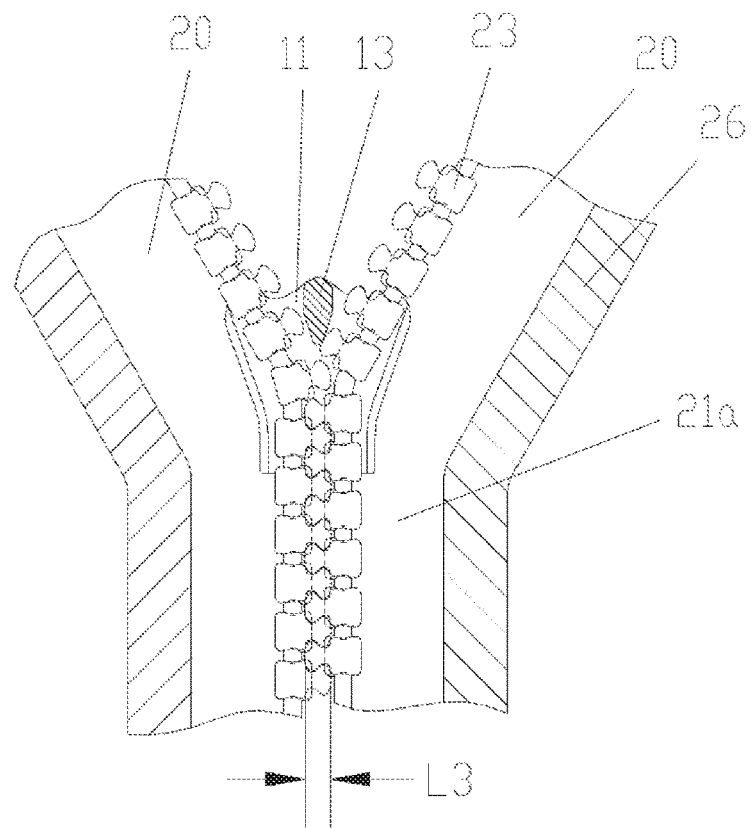
FIG. 6 is a schematic view of a front surface structure of a slide fastener according to a sixth embodiment of the disclosure, wherein a slider is partially cut away to remove an upper blade.
Figure 7:
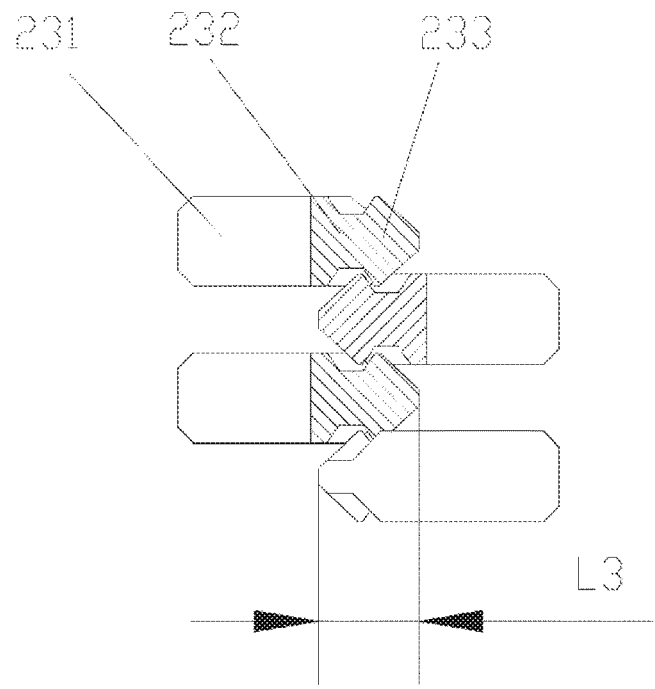
FIG. 7 is a schematic enlarged view of FIG. 6, showing three adjacent fastener elements in an engaged state.
Figure 8:
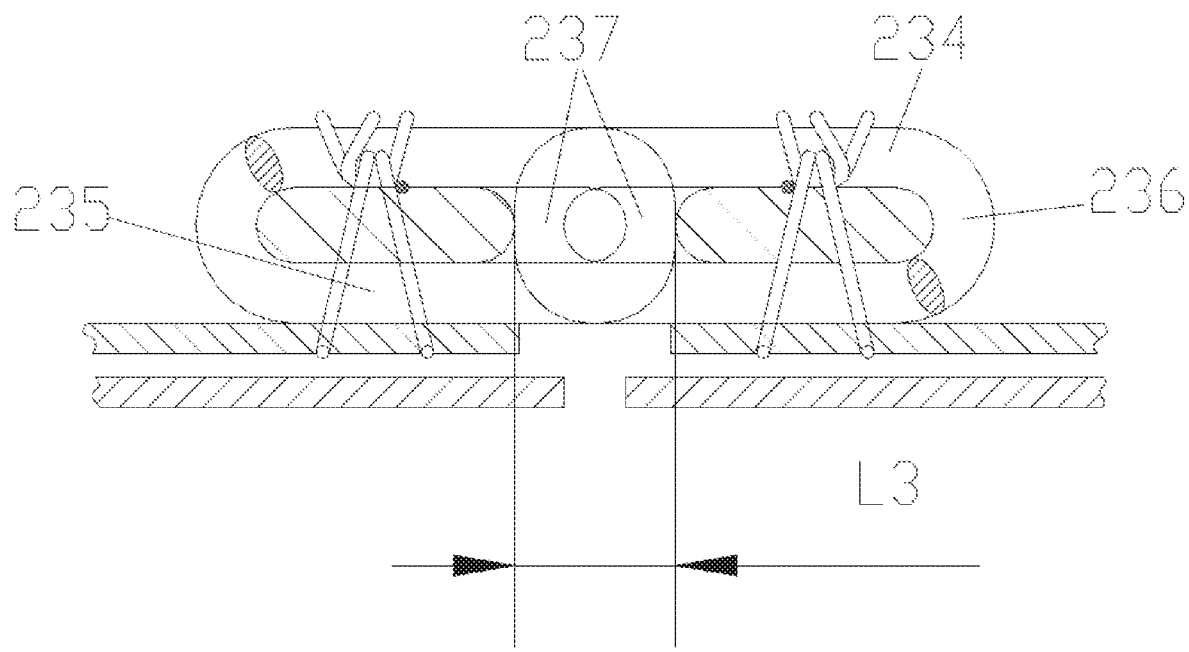
FIG. 8 is a schematic partial cross-sectional view of a slide fastener according to a seventh embodiment of the disclosure.

In addition, in the embodiment in FIG. 6 to FIG. 8, L is equal to or less than an overlap distance L3 between the fastener element 23 on the first fastener tape and the fastener element 23 on the second fastener tape after the fastener elements 23 are engaged with each other.

FIG. 6 to FIG. 7 illustrate a resin slide fastener (i.e., the fastener element thereof is made of resin). In such type of slide fastener, each fastener element 23 includes a main body part 231, a head part 233, and a neck part 232 connecting the main body part 231 with the head part 233, wherein the main body part 231 is for being fixed to the first fastener tape part 21a of the fastener tape body 21, and the head part 233 of the fastener element 23 on one fastener tape 20 matches the neck part 232 of the fastener element 23 on the other fastener tape 20, thereby realizing engagement between the fastener elements 23. After engagement, the overlap distance between the fastener elements 23 respectively belonging to the two different fastener tapes 20 is L3, and the distance L between the second sides of the two fastener tapes 20 is at least shorter than the overlap distance L3 between the fastener elements 23 after the fastener elements 23 are engaged with each other.

FIG. 8 illustrates a nylon slide fastener in which a fastener element is made of nylon. In such type of slide fastener, each fastener element 23 includes an upper leg part 234, a lower leg part 235, as well as a connection part 236 and a head part 237 respectively connecting the upper leg part 234 with the lower leg part 235 on an outer side and an inner side. After engagement between the head parts 237 of the fastener elements 23, the overlap distance between the head parts 237 of the fastener elements 23 respectively belonging to the two different fastener tapes 20 is L3. Then, the distance L between the second sides of the two fastener tapes 20 is at least shorter than the overlap distance L3 between the head parts 237 after the head parts 237 are engaged with each other.

When the value of the distance L between the second side of the first fastener tape and the second side of the second fastener tape is set in accordance with the above embodiments, the shielding and covering with respect to the slider and/or the fastener element can be more effectively realized, and the comfortableness of the slide fastener for the human body can be improved.

A third aspect of the disclosure further provides a fastener tape manufacturing device, and an embodiment thereof is illustrated in FIG. 10 to FIG. 18. The fastener tape manufacturing device of the disclosure is mainly for folding a fastener tape body and forming a fixing holding part to maintain the folded state of the fastener tape body.

Figure 10:
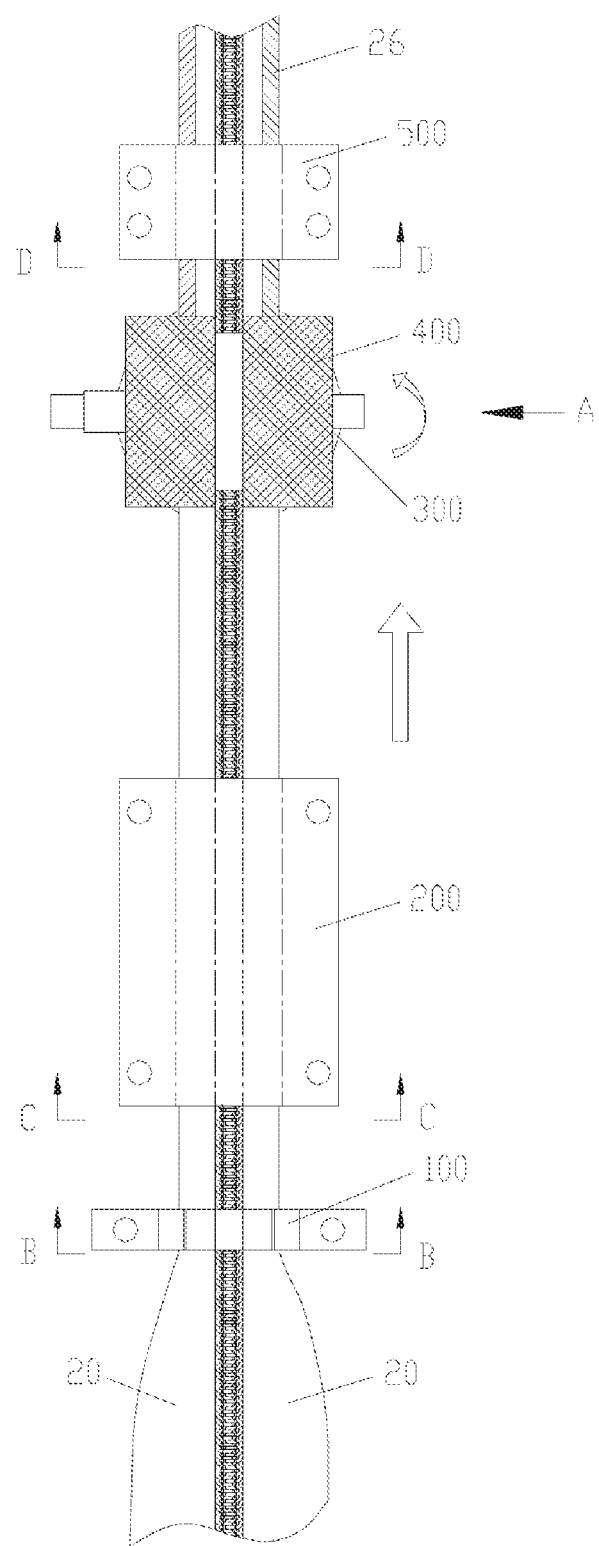
FIG. 10 is a schematic view of a working state of a fastener tape manufacturing device according to an embodiment of the disclosure.
Figure 13:
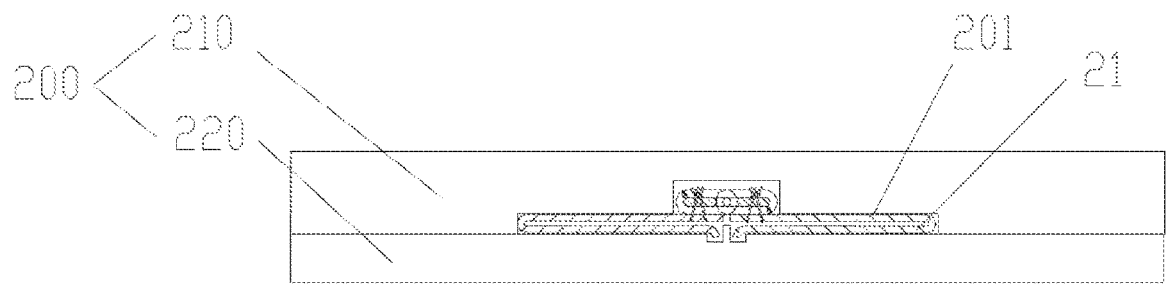
FIG. 13 is a cross-sectional view taken along C-C in FIG. 10.

As shown in FIG. 10, the fastener tape manufacturing device includes: a first restricting part 200, having a first containing chamber 201 for allowing insertion of the fastener tape 20 therethrough so as to restrict the fastener tape 20, wherein the fastener tape body 21 of the fastener tape 20 is inserted through the first containing chamber 201 while in a folded state, as shown in FIG. 13; a fixing forming part 300 located downstream of the first restricting part 200 and for processing the folded fastener tape body 21 to form the fixing holding part 26; and a fastener tape driving part 400 for driving the fastener tape 20 to be fed from upstream to downstream along the length direction of the fastener tape 20. According to some embodiments, the fastener tape driving part 400 is located downstream of the first restricting part 200, and is thus capable of drawing the fastener tape 20 to be inserted through the first restricting part 200 when driving the feeding of the fastener tape 20.

Under driving by the fastener tape driving part 400, the fastener tape 20 in the folded state is continuously inserted through the first restricting part 200, and then passes through the fixing forming part 300. Under action of the fixing forming part 300, the fixing holding part 26 is formed and the folded state of the fastener tape 20 is thereby fixed and maintained.

Before the fastener tape 20 is inserted through the first restricting part 200, a start portion of the fastener tape body 21 of the fastener tape 20 needs to be folded first, and this task, for example, can be completed manually by an operator; after the fastener tape 20 is inserted through the first restricting part 200, as the fastener tape 20 is fed, the subsequent portion of the fastener tape body 21 may continuously be folded, and this task can still be completed manually by the operator.

However, the above tasks may also be completed automatically, rather than manually by the operator. In order to achieve this, the fastener tape manufacturing device further includes: a bending forming part 100 located upstream of the first restricting part 200, having a second containing chamber 101 for allowing insertion of the fastener tape 20 therethrough, wherein the fastener tape body 21 of the fastener tape 20 is inserted through the second containing chamber 101 while in a non-folded state, and the second side of the fastener tape body 21 is bent toward the back side of the fastener tape body 21 after the fastener tape body 21 is inserted through the second containing chamber 101, as specifically shown in FIG. 12.

In this way, the operator can be saved from manually folding the fastener tape body, and the level of automation and production efficiency are enhanced. Specifically, during operation, all the operator needs to do is to insert the fastener tape body 21 through the second containing chamber 101 so that the fastener tape body 21 has been in the bent state when leaving the second containing chamber 101, and then to insert the bent fastener tape 20 through the first restricting part 200. When the fastener tape driving part 400 initiates the operation, the subsequent portion of the fastener tape 20 is drawn to pass through the bending forming part 100 and the first restricting part 200 in sequence. Thus, the fastener tape body 21 in a naturally extended state is automatically and continuously changed into the folded state, so as to be easily processed by the fixing forming part 300 to form the fixing holding part 26.

Figure 12:
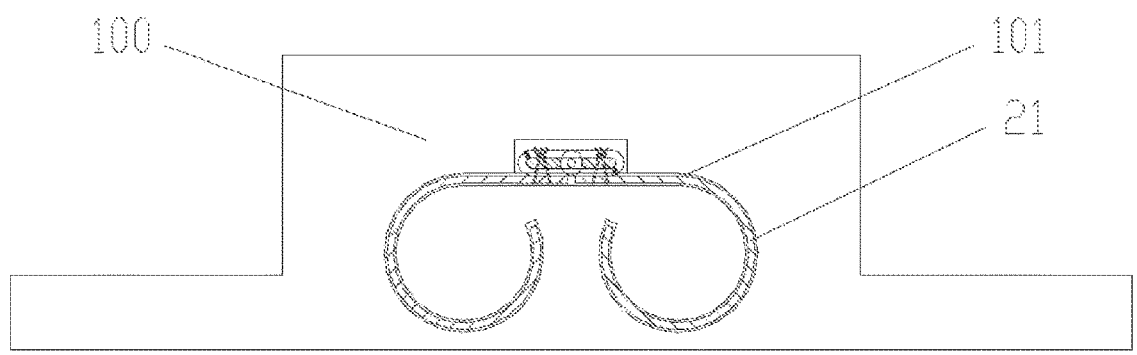
FIG. 12 is a cross-sectional view taken along B-B in FIG. 10.
Figure 15:
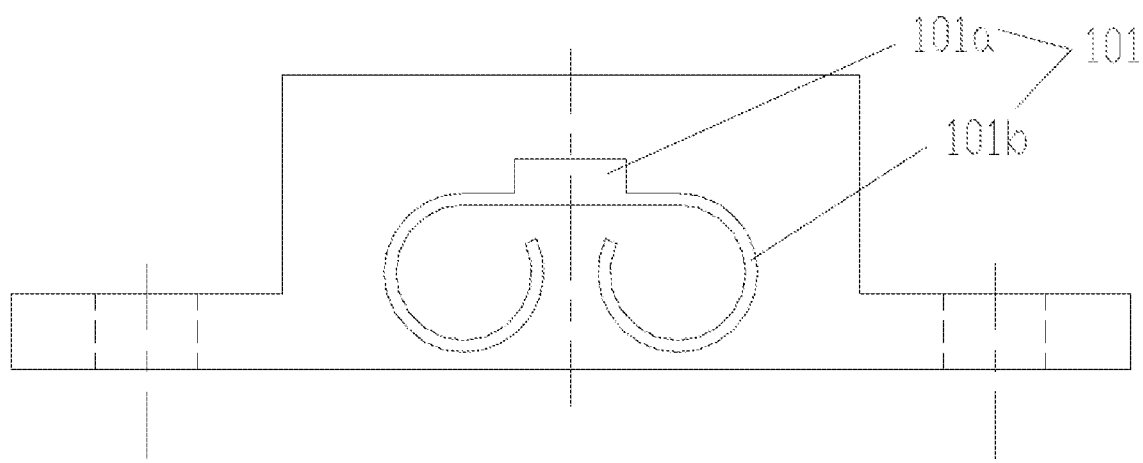
FIG. 15 is a schematic view of an embodiment of a bending forming part.

In addition, as shown in FIG. 12 and FIG. 15, the second containing chamber 101 may include two portions, a first portion 101*a* for allowing insertion of the fastener element therethrough, and a second portion 101*b* for allowing insertion of the fastener tape body 21 therethrough, wherein the second portion 101*b* is a circular arc-shaped slit, and a far end (i.e., an end far from the first portion 101*a*) of the second portion 101*b* is located below the first portion 101*a*.

Alternatively, the second portion 101*b* of the second containing chamber 101 may be a horizontal U-shaped slit, or a horizontal V-shaped slit, or the like.

In addition, the fixing forming part 300 includes an ultrasonic vibrating device 301. The ultrasonic vibrating device 301 uses energy generated by ultrasonic vibrations to pressure weld the two portions of the fastener tape body 21 of the fastener tape 20 together in a fusion manner, thus forming the fixing holding part 26. It is easy to perceive that, in order to realize the ultrasonic pressure welding, the fixing forming part 300 may further include an abutment structure (not illustrated). The abutment structure is opposing the ultrasonic vibrating device 301, and the fastener tape body 21 in the folded state is sandwiched between the abutment structure and the ultrasonic vibrating device 301, thus realizing the ultrasonic pressure welding.

Figure 11:
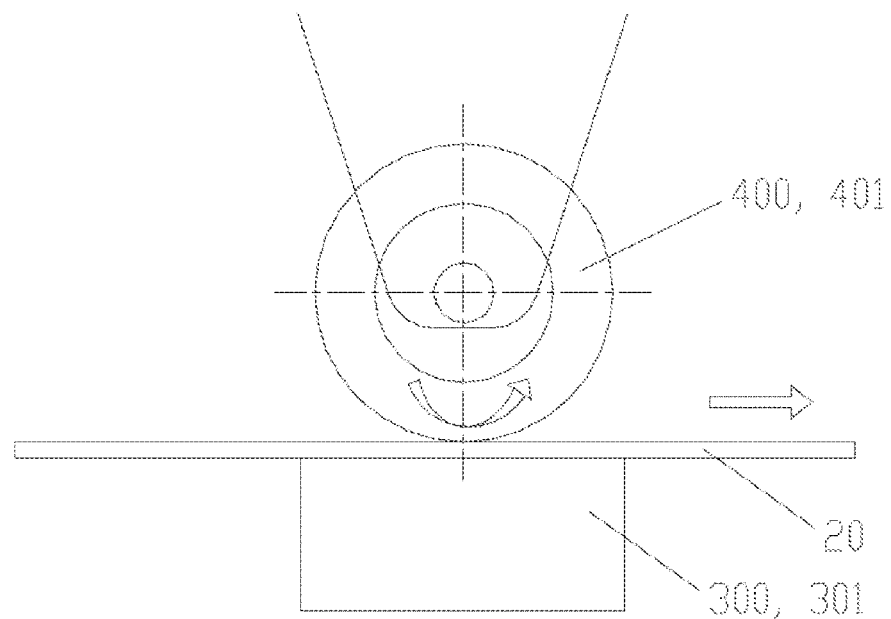
FIG. 11 is a partial view taken along direction A in FIG. 10.

In addition, as shown in FIG. 10 and FIG. 11, the fastener tape driving part 400 includes a roller 401. A rolling surface of the roller 401 contacts the fastener tape 20 and thus drives the feeding of the fastener tape 20.

In addition, as shown in FIG. 10 and FIG. 11, the rolling surface of the roller 401 is opposing the ultrasonic vibrating device 301 of the fixing forming part 300, and the fastener tape body 21 in the folded state is sandwiched between the roller 401 and the ultrasonic vibrating device 301, thus driving the feeding of the fastener tape 20 while facilitating the ultrasonic pressure welding performed by the ultrasonic vibrating device 301. That is, in the present embodiment, the roller 401 may also serve as the aforesaid abutment structure.

Figure 18:
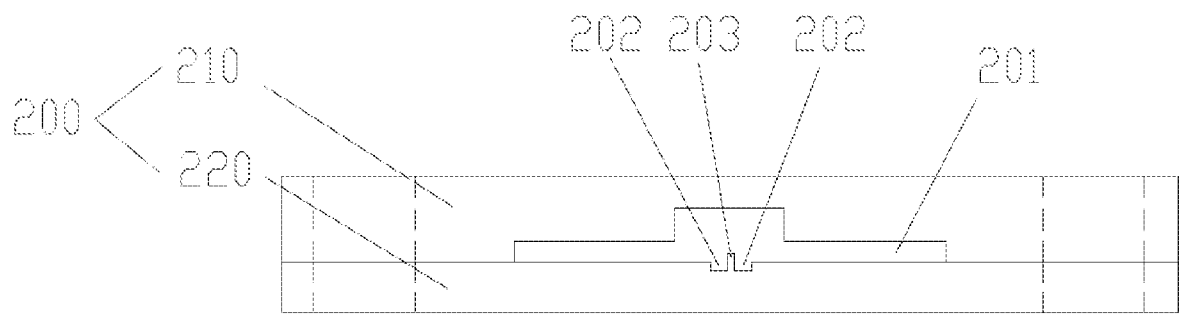
FIG. 18 is a schematic view of the upper die and the lower die of the first restricting part in an assembled state.

In addition, as shown in FIG. 13 and FIG. 18, the first restricting part 200 includes an upper die 210 and a lower die 220, and the first containing chamber 201 is formed between the upper die 210 and the lower die 220.

Figure 16:
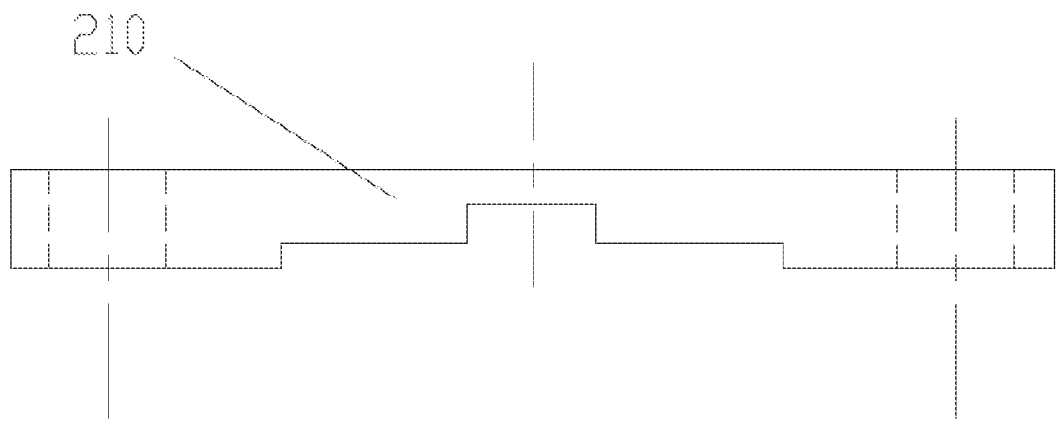
FIG. 16 is a schematic view of an embodiment of an upper die of a first restricting part.
Figure 17:
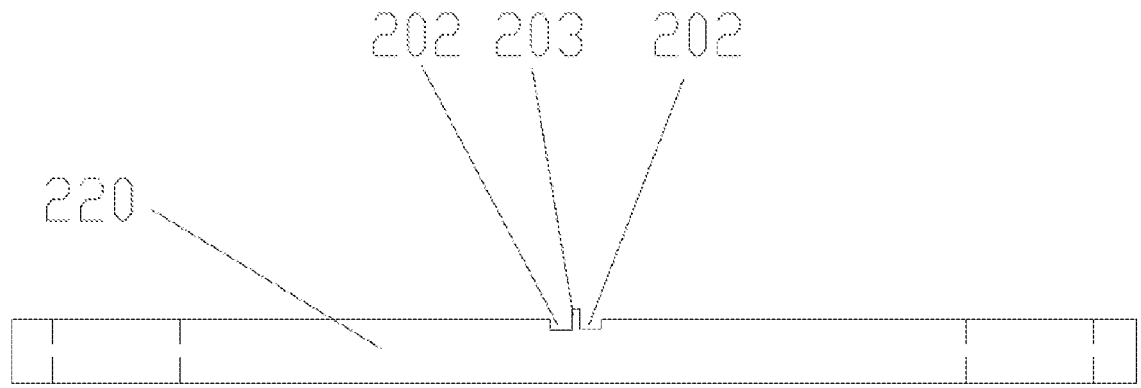
FIG. 17 is a schematic view of an embodiment of a lower die of the first restricting part.

The structure of the upper die 210 is shown in FIG. 16, and the structure of the lower die 220 is shown in FIG. 17.

Figure 14:
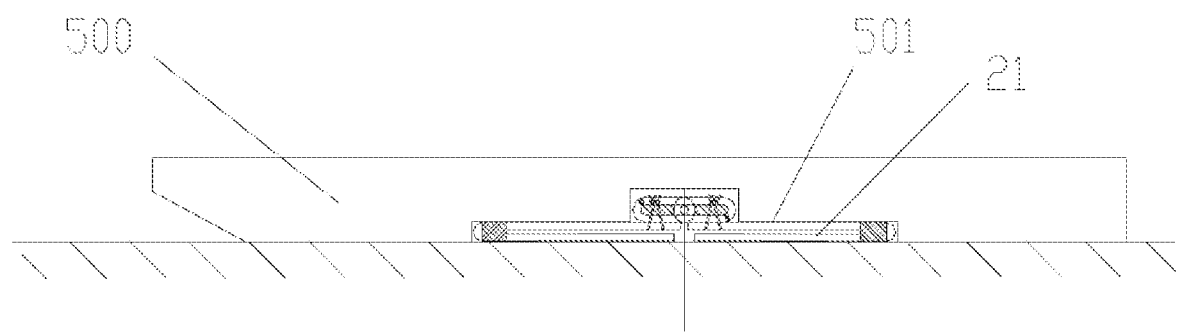
FIG. 14 is a cross-sectional view taken along D-D in FIG. 10.

As shown in FIG. 10 and FIG. 14, a second restricting part 500 may further be disposed downstream of the fixing forming part 300. The second restricting part 500 has a third containing chamber 501 for allowing insertion of the fastener tape 20 therethrough so as to restrict the fastener tape 20. Under the joint restricting effect of the first restricting part 200 and the second restricting part 500, the fastener tape 20 in the folded state can pass through the fixing forming part 300 straightly and smoothly, thus ensuring operation quality of the fixing forming part 300 in forming the fixing holding part 26.

It should be mentioned that, in the illustrated embodiment, the first restricting part 200 and the bending forming part 100 both have a left-right symmetrical structure. For example, as shown in FIG. 13 and FIG. 16 to FIG. 18, the first containing chamber 201 has a left-right symmetrical structure for simultaneously containing two fastener tapes 20 in the joined state, wherein the fastener tape bodies 21 of both fastener tapes 20 are in the folded state (as shown in FIG. 10). As shown in FIG. 12 and FIG. 15, the second containing chamber 101 also has a left-right symmetrical structure for simultaneously containing two fastener tapes 20 in the joined state, such that the fastener tape bodies 21 of both fastener tapes 20 can be simultaneously changed from the naturally extended state into the folded state. Correspondingly, the roller 401 includes two coaxially arranged rollers. These two rollers are both opposing the ultrasonic vibrating device 301, and are thus capable of performing the ultrasonic pressure welding process simultaneously on the fastener tape bodies 21 of the two fastener tapes 20 to form two fixing holding parts 26 at the same time. Thus, the production efficiency for the fastener tape is enhanced. That is, in the present embodiment, the fastener tape manufacturing device is capable of processing two fastener tapes for forming a slide fastener at the same time. Thus, the fastener tape manufacturing device essentially constitutes a slide fastener manufacturing device.

In addition, as shown in FIG. 13 and FIG. 18, a concave groove 202 is provided in the vicinity of the center of a bottom surface of the first containing chamber 201 and is for accommodating the second side 24 of the fastener tape body 21. With respect to the case where the second fastener tape part 21b of the fastener tape body 21 has a wider dimension (for example, when the respective second fastener tape parts 21b of the first fastener tape and the second fastener tape overlap each other), the concave groove 202 may more reliably accommodate part of the width of the second fastener tape part 21b closer to the second side 24, as shown in FIG. 13, thus preventing wrinkles or the like from occurring in the second fastener tape part 21b, and ensuring production quality of the fastener tape or the slide fastener.

In addition, a partition wall 203 is disposed in the middle of the concave groove 202 along a longitudinal direction of the concave groove 202, thus dividing the concave groove 202 into two concave grooves independent of each other, so as to accommodate the respective second sides 24 of the first fastener tape and the second fastener tape respectively so that the second sides 24 do not contact each other. Further, it is prevented that wrinkles occur in the second fastener tape part 21b due to overlap of two second fastener tape parts 21b, and production quality of the fastener tape is enhanced.

Those skilled in the art should easily understand that the aforesaid solutions may be freely combined with each other without conflict.

It should be understood that, the aforesaid embodiments are only exemplary rather than limitative. Various obvious or equivalent modifications or replacements made by those skilled in the art to the above details without departing from the basic principle of the disclosure will fall within the scope of the claims of the disclosure.

What is claimed is:

1. A fastener tape, comprising:
   a faster tape body including a first fastener tape part, a second fastener tape part, a bent part and a fixing holding part, wherein the bent part connects the first fastener tape part and the second fastener tape part, and the first fastener tape part is disposed at a first side of the fastener tape body, the second fastener tape part is disposed at a second side of the fastener tape body opposite to the first side, and the second fastener tape body is fixed to the first fastener tape body by the fixing holding part,
   a plurality of fastener elements extending along a length direction of the fastener tape, wherein the plurality of fastener elements are fixed to the first side of the fastener tape body and away from the bent part and the fixing holding part,
   in a width direction orthogonal to the length direction of the fastener tape, a width dimension of the fixing holding part is 10% to 50% of a width dimension of the first fastener tape part of the fastener tape body,
   the fixing holding part is a component different from the bent part,
   the fixing holding part comprises a thermally welded structure directly contacting the first fastener tape part and the second fastener tape part.

2. The fastener tape according to claim 1, wherein the fixing holding part is adjacent to the bent part.

3. A fastener tape, comprising:
   a faster tape body including a first fastener tape part, a second fastener tape part, a bent part and a fixing holding part, wherein the bent part connects the first fastener tape part and the second fastener tape part, and the first fastener tape part is disposed at a first side of the fastener tape body, the second fastener tape part is disposed at a second side of the fastener tape body opposite to the first side, and the second fastener tape body is fixed to the first fastener tape body by the fixing holding part,
   a plurality of fastener elements extending along a length direction of the fastener tape, wherein the plurality of fastener elements are fixed to the first side of the fastener tape body and away from the bent part and the fixing holding part,
   in a width direction orthogonal to the length direction of the fastener tape, a width dimension of the fixing holding part is 10% to 50% of a width dimension of the first fastener tape part of the fastener tape body,
   the fixing holding part is a component different from the bent part,
   the fixing holding part comprises an adhesive layer disposed between the first fastener tape part and the second fastener tape part to fix the second fastener tape part to the first fastener tape part.

4. The fastener tape according to claim 3, wherein the fixing holding part is adjacent to the bent part.

* * * * *